US 011386305B2

(12) United States Patent
Huang et al.

(10) Patent No.: US 11,386,305 B2
(45) Date of Patent: Jul. 12, 2022

(54) DEVICE AND METHOD FOR DETECTING PURPOSE OF ARTICLE

(71) Applicant: INSTITUTE FOR INFORMATION INDUSTRY, Taipei (TW)

(72) Inventors: Chu-Chun Huang, Taipei (TW); Yu-Chuan Yang, Taipei (TW); Yen-Heng Tsao, Taipei (TW); Tzu-Ying Chen, Taipei (TW); Po-Hsien Chiang, Taipei (TW); Fu-Jheng Jheng, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 51 days.

(21) Appl. No.: 17/106,171

(22) Filed: Nov. 29, 2020

(65) Prior Publication Data
US 2022/0138508 A1    May 5, 2022

(30) Foreign Application Priority Data

Nov. 3, 2020  (TW) .................................. 109138319

(51) Int. Cl.
*G06K 9/00*     (2022.01)
*G06K 9/62*     (2022.01)
*G06F 40/284*   (2020.01)

(52) U.S. Cl.
CPC ......... *G06K 9/6268* (2013.01); *G06F 40/284* (2020.01); *G06K 9/623* (2013.01); *G06K 9/6215* (2013.01); *G06K 9/6261* (2013.01)

(58) Field of Classification Search
CPC .. G06K 9/6268; G06K 9/6215; G06K 9/6261; G06K 9/623; G06K 9/38; G06K 9/202; G06K 9/2011; G06K 9/20; G06K 9/346; G06K 9/32; G06K 9/3286; G06K 9/00084; G06K 9/6407; G06K 9/2009; G06K 9/6423; G06K 9/342; G06K 9/48; G06K 9/4638; G06K 9/4609; G06K 9/6476; G06T 7/0081; G06T 7/0083; G06T 7/001; G06T 2207/20144; G06T 2207/10016;
(Continued)

(56) References Cited

U.S. PATENT DOCUMENTS 11,003,856 B2 * 5/2021 Kiros ................... G06N 3/0445
2018/0329882 A1 * 11/2018 Bennett ................. G06N 20/00
(Continued)

FOREIGN PATENT DOCUMENTS

CN    111368075 A    7/2020

OTHER PUBLICATIONS

The office action of the corresponding Taiwanese application No. TW109138319 dated Sep. 10, 2021.

*Primary Examiner* — Amir Alavi
(74) *Attorney, Agent, or Firm* — CKC & Partners Co., LLC

(57) ABSTRACT

A device and a method for detecting a purpose of an article are provided. The device is configured to divide the article into a plurality of sentences and input the sentences to a feature identification model to generate a contextualized word vector corresponding to each of the sentences. The device further inputs the representation to a specific purpose detecting model to generate a distributed representation similarity of the article. When the distributed representation similarity of the article is greater than a threshold, the device determines that the article conforms to a specific purpose.

20 Claims, 13 Drawing Sheets

(58) Field of Classification Search
CPC ......... G06T 2207/30176; G06F 17/243; G06F 17/30249; H04N 1/38; G11B 27/28
See application file for complete search history.

(56) References Cited

U.S. PATENT DOCUMENTS

| | | |
|---|---|---|
| 2020/0106632 A1* | 4/2020 | Lewis .................... H04L 12/282 |
| 2021/0004690 A1* | 1/2021 | Chaudhary .............. G06N 3/08 |
| 2021/0034812 A1* | 2/2021 | Mezaoui ................. G06F 16/35 |
| 2021/0109958 A1* | 4/2021 | Behtash ................. G06F 40/30 |
| 2021/0142164 A1* | 5/2021 | Liu ........................ G06F 40/30 |
| 2021/0174193 A1* | 6/2021 | Pouran Ben Veyseh .................... G06N 7/005 |
| 2021/0182328 A1* | 6/2021 | Rollings ............... G06F 16/313 |
| 2021/0271822 A1* | 9/2021 | Bui ........................ G06N 3/08 |
| 2021/0357595 A1* | 11/2021 | Perez ...................... G09B 7/02 |
| 2022/0067051 A1* | 3/2022 | Zhang ..................... G06N 3/02 |

* cited by examiner

DEVICE AND METHOD FOR DETECTING PURPOSE OF ARTICLE

RELATED APPLICATIONS

This application claims priority to Taiwan Application Serial Number 109138319, filed Nov. 3, 2020, which is herein incorporated by reference in its entirety.

BACKGROUND

Field of Invention

The present disclosure relates to a device and a method for detecting a purpose of an article. More particularly, the present disclosure relates to a device for detecting a purpose of an article that uses a contextualized word vector of each of divided sentences and a distributed representation similarity corresponding to the article to determine whether the article has a specific purpose or not.

Description of Related Art

With the development of communication media, users usually receive information of different types (e.g., politics, health, life, and traffic accidents, etc.) when using communication software or browsing social media. However, there may be much fake information among the received information. In addition, it is not easy for users to identify information with specific purposes in articles read on the Internet, and users can be easily misled. Therefore, there are some information checking service systems or departments, which check whether the content of the information is correct or whether the information has specific purposes, such as inducing users to forward messages or arousing certain emotions of users, etc. If the information with specific purposes needs to be checked or investigated, a large amount of domain knowledge fields or manpower with recognition capabilities are relied on before the judgments can be made. This method results in a slow checking speed.

For the foregoing reasons, there is a need to provide a mechanism for detecting a purpose of an article that can automatically identify an article having information with a specific purpose, which is a technical problem that the industry and the academia are eager to resolve.

SUMMARY

An objective of the present disclosure is to provide a mechanism for detecting a purpose of an article, which generates a contextualized word vector of each of sentences in an article via a feature identification model, then inputs the contextualized word vector of each of the sentences in the article to a specific purpose detecting model to obtain a distributed representation similarity of the article, and determines a specific purpose of the article according to the distributed representation similarity of the article. Accordingly, the mechanism for detecting the purpose of the article according to the present disclosure can not only automatically identify whether the article has the specific purpose or not, but also further identify which specific purpose the article corresponding to. In addition to that, the manpower load of checking personnel can be reduced via the mechanism for detecting the purpose of the article according to the present disclosure.

A device for detecting a purpose of an article is provided. The device for detecting the purpose of the article comprises a transceiver, a storage, and a processor. The storage is configured to store a feature identification model and a specific purpose detecting model. The processor is electrically connected to the storage and the transceiver, and is configured to perform the following operations: receiving a first article via the transceiver; dividing the first article into a plurality of first sentences; inputting the first sentences to the feature identification model to generate a first contextualized word vector corresponding to each of the first sentences; inputting the first contextualized word vector of the first sentences in the first article to the specific purpose detecting model to generate a distributed representation similarity of the first article; and determining that the first article conforms to a first specific purpose when the distributed representation similarity is greater than a first threshold.

The present disclosure further provides a method for detecting a purpose of an article comprising the following steps: receiving a first article; dividing the first article into a plurality of first sentences; inputting the first sentences to a feature identification model to generate a first contextualized word vector corresponding to each of the first sentences; inputting the first contextualized word vector of the first sentences in the first article to a specific purpose detecting model to generate a distributed representation similarity of the first article; and determining that the first article conforms to a first specific purpose when the distributed representation similarity is greater than a first threshold.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

In the following description, the present disclosure will be explained with reference to embodiments thereof. However, these embodiments are not intended to limit the present disclosure to any specific environments, applications or particular implementations described in these embodiments. The following description of these embodiments is only for the purpose of illustration rather than to limit the present disclosure. Furthermore, it should be appreciated that in the following embodiments and the attached drawings, elements not directly related to the present disclosure are omitted from depiction; and dimensional relationships among individual elements in the attached drawings are illustrated only for ease of understanding, but not to limit the actual scale.

Figure 1:
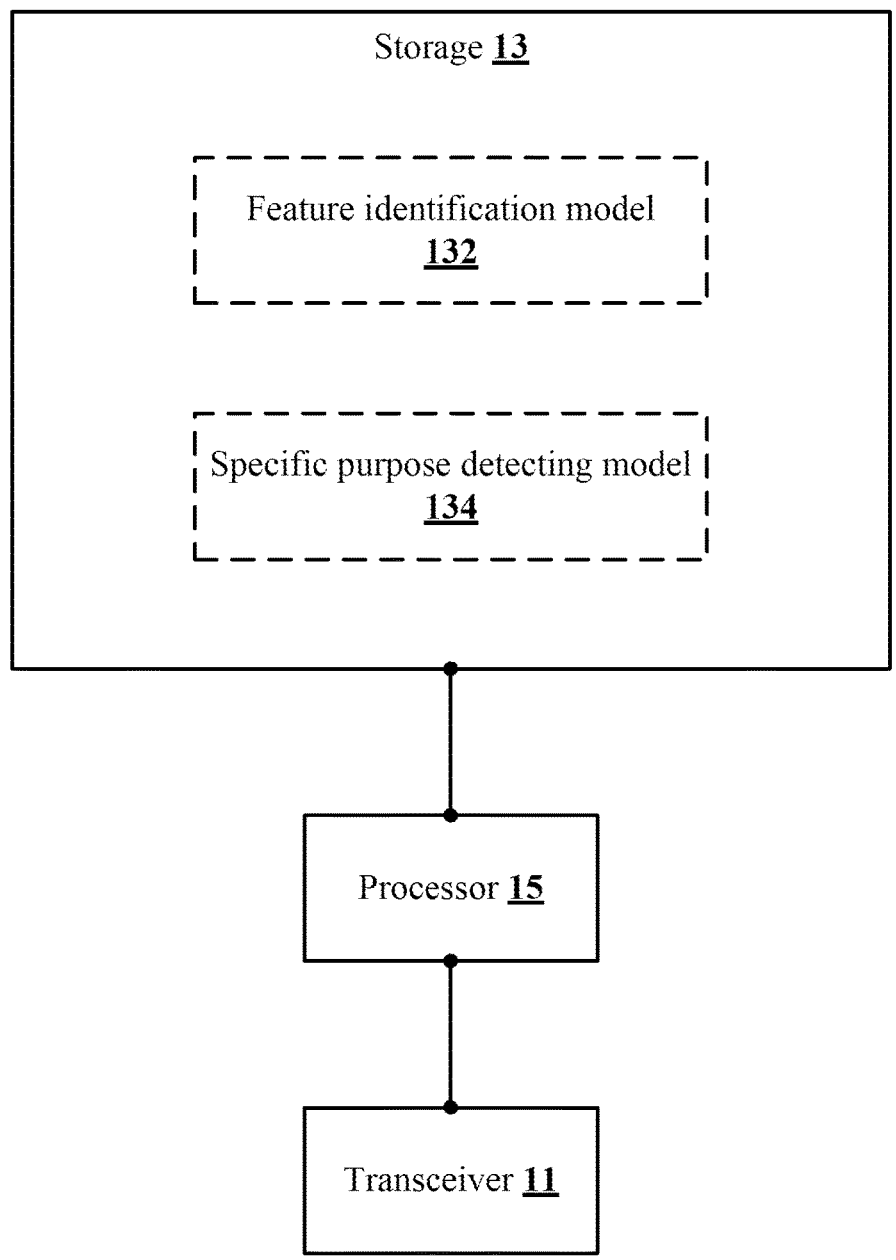
FIG. 1 depicts a schematic diagram of a device for detecting a purpose of an article according to the present disclosure.
Figure 2:
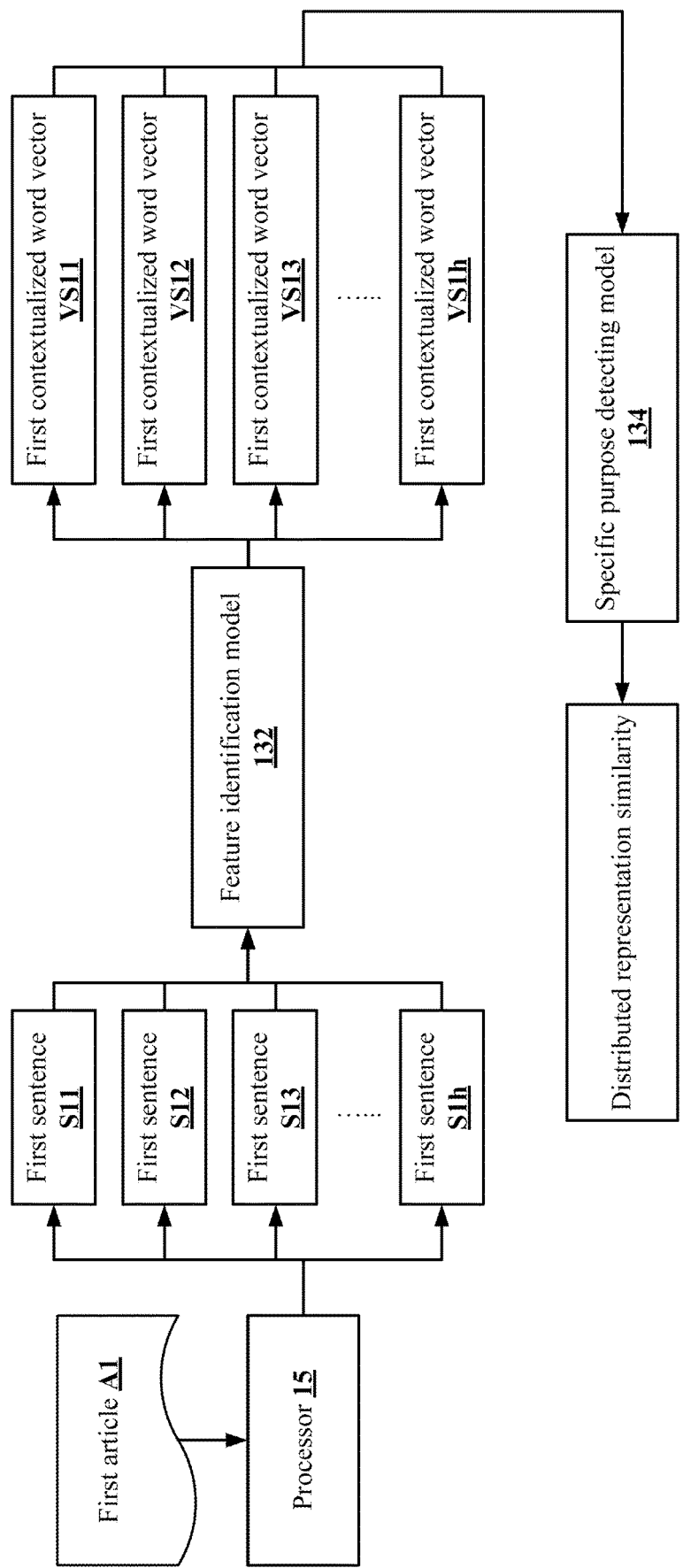
FIG. 2 depicts a schematic diagram of a process of detecting a purpose of an article according to a first embodiment of the present disclosure.
Figure 3:
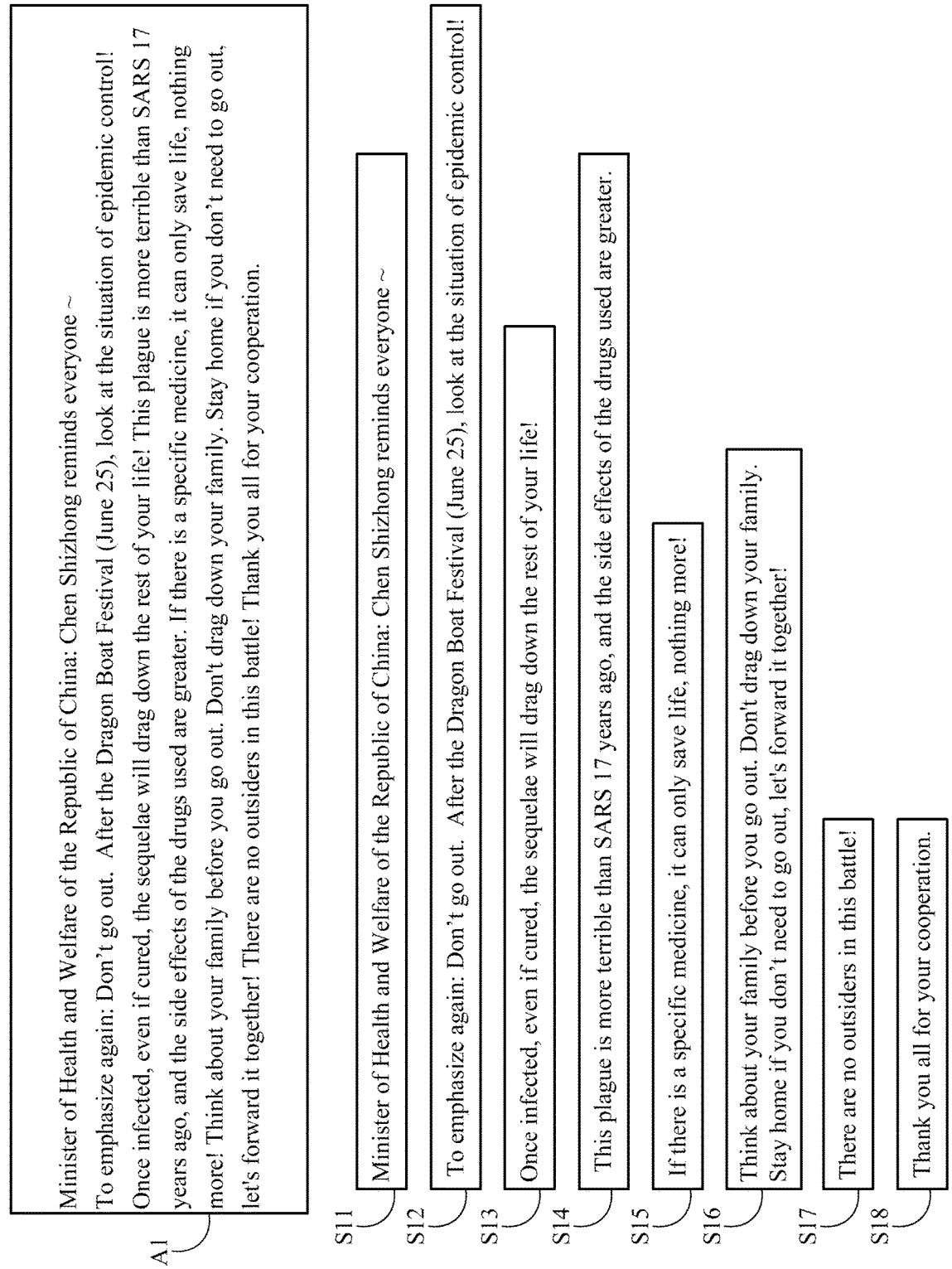
FIG. 3 depicts a schematic diagram of dividing an article into sentences in detecting a purpose of the article according to the present disclosure.

A first embodiment of the present disclosure is shown in FIG. 1 to FIG. 3. FIG. 1 depicts a schematic diagram of a device for detecting a purpose of an article 1 according to the present disclosure, and FIG. 2 depicts a schematic diagram of a process flow of detecting a purpose of an article according to a an embodiment of the present disclosure. The device for detecting the purpose of the article 1 includes a transceiver 11, a storage 13, and a processor 15. The processor 15 is electrically connected to the storage 13 and the transceiver 11. The storage 13 is configured to store a feature identification model 132 and a specific purpose detecting model 134.

The processor 15 divides a first article A1 into first sentences S11, S12, S13 . . . S1$h$ after receiving the first article A1 via the transceiver 11, and inputs the first sentences S11, S12, S13 . . . S1$h$ to the feature identification model 132 to generate first contextualized word vector VS11, VS12, VS13 . . . VS1$h$ corresponding to the first sentences S11, S12, S13 . . . S1$h$. In some embodiments, each of the first contextualized word vector VS11, VS12, VS13 . . . VS1$h$ includes feature vectors, and each of the feature vectors corresponds to a feature. The feature may be one of different semantic features or features that cause others to react in the sentence, which include being arbitrary, being emotional, being inferential, being appealing, comprising a personal testimonial, being advocative and sharing, etc. These features can be defined and marked in training sentences by professionals when training the feature identification model 132, so that the feature identification model 132 is trained to be able to identify these features.

Then, the processor 15 inputs the first contextualized word vector VS11, VS12, VS13 . . . VS1$h$ of the first sentences S11, S12, S13 . . . S1$h$ in the first article A1 to the specific purpose detecting model 134 to generate a distributed representation similarity of the first article A1. When the distributed representation similarity of the first article A1 is greater than a first threshold, the processor 15 determines that the first article A1 conforms to a first specific purpose.

For example, a schematic diagram of dividing an article into sentences may be referred to FIG. 3. After the processor 15 receives the first article A1 and divides the first article A1 into the first sentences S11, S12, S13, S14, S15, S16, S17, S18, the processor 15 inputs all the first sentences S11, S12, S13, S14, S15, S16, S17, S18 to the feature identification model 132. The feature identification model 132 maps each of the first sentences to a multi-dimensional vector space according to a specific rule to obtain the first contextualized word vector of each of the first sentences in the multi-dimensional vector space.

After that, the processor 15 merges the first contextualized word vector output by the feature identification model 132 into a contextualized word vector of the first article A1 and inputs the contextualized word vector of the first article A1 to the specific purpose detecting model 134, so as to determine whether the contextualized word vector of the first article A1 in the multi-dimensional vector space is similar to a contextualized word vector of an article with the first specific purpose in the multi-dimensional vector space or not. For example, when a distributed representation similarity is greater than the first threshold, the processor 15 determines that the first article A1 conforms to the first specific purpose.

For example, it is assumed that the first threshold is 0.7. If the distributed representation similarity between the contextualized word vector of the first article A1 and the contextualized word vector of the article with the first specific purpose is 0.8, the processor 15 determines that the first article A1 conforms to the first specific purpose when determining that the distributed representation similarity between the two is greater than 0.7

It is noted that the amount of the first sentences mentioned above is for illustrative purposes only and is not intended to limit the present disclosure. The the amount of the first sentences depends on the first article and a word count of each of the sentences in the first article. In addition, it is noted that the first threshold may be determined depending on different types of specific purposes. Or, the first thresholds of all types of specific purposes may be set to be the same.

In other embodiments, after the processor 15 inputs the first contextualized word vector of the first sentences in the first article to the specific purpose detecting model 134, not only is the distributed representation similarity of the first article generated, but an article score of the first article is also generated. When the article score is greater than a second threshold, the processor 15 determines that the first article conforms to the first specific purpose. In other words, the processor 15 needs to determine whether the first article conforms to the first specific purpose or not based on the distributed representation similarity of the first article and the article score of the first article at the same time in other embodiments.

Additionally, the device for detecting the purpose of the article 1 further includes a display interface in other embodiments. The processor 15 can display the first article A1, the first sentences S11-S18, a feature corresponding to each of the first sentences, and the article score via the display interface. The feature corresponding to each of the first sentences uses a feature with a greatest feature vector value among the feature vectors of one of the first contextualized word vector corresponding to the each of the first sentences as the feature corresponding to the each of the first sentences.

Figure 4:
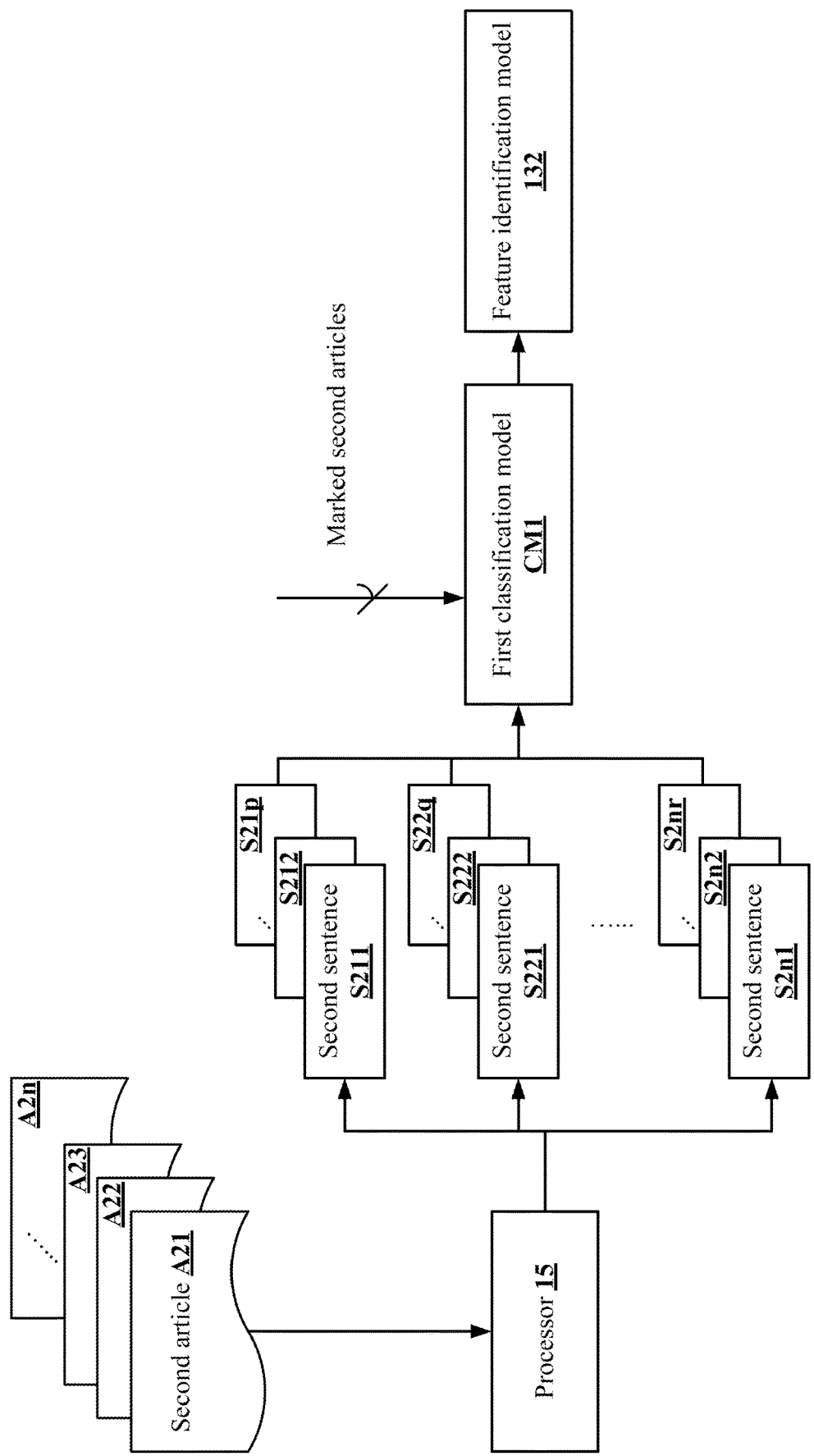
FIG. 4 depicts a schematic diagram of an implementation process flow of training a feature identification model according to a second embodiment of the present disclosure.

A second embodiment of the present disclosure is shown in FIG. 4. In the present embodiment, the storage 13 is further configured to store a first classification model CM1. How to train the first classification model CM1 into the feature identification model 132 will be described below.

The processor 15 divides each of the second articles into second sentences according to an analysis rule after receiving the second articles via the transceiver 11, and then marks a feature corresponding to each of the second sentences in each of the second articles according to the analysis rule. The analysis rule can be a sentence breaking rule. After that, the processor 15 inputs the marked second sentences and their corresponding features to the first classification model CM1, and performs supervised learning on the first classification model CM1 to train it and generate the feature identification model 132.

A description is provided with reference to FIG. 4. In greater detail, after the processor 15 receives n second articles A21, A22, A23 . . . A2n, the processor 15 divides each of the n second articles A21, A22, A23 . . . A2n into the second sentences based on a semantic analysis. For example, the second article A21 is divided into p second sentences S211, S212 . . . S21p, the second article A22 is divided into q second sentences S221, S222 . . . S22q, until an nth second article A2n is divided into r second sentences S2n1, S2n2 . . . S2nr.

When the processor 15 divides the article, it can first use a period in the article as a break so as to divide the sentence. Since the first classification model CM1 has a word count limit for the input sentence, another punctuation mark (such as a comma) in the sentence is used to further divide the sentence if the word count of the divided sentence exceeds the sentence word count limit of the first classification model CM1, and the divided sentence must have a complete meaning.

In other words, when the processor 15 divides the article, it considers the rule that which punctuation marks break a sentence in the article having the complete meaning, and also considers the word count limit required by the first classification model CM1, to determine how to divide the sentence. If the word count limit is exceeded, an intermediate value (for example: the word count divided by 2) can be taken, and then look back for a punctuation mark to divide the sentence.

After dividing the article into the sentences, the processor 15 marks a feature of each of the sentences, for example, one of different semantic features or various features that arouse other people's emotions or actions (such as forwarding a message), which include being arbitrary, being emotional, being inferential, being appealing, comprising a personal testimonial, comprising titled content, being advocative and sharing, etc. The processor 15 also inputs all the sentences after their features are marked to the first classification model CM1 for supervised learning.

The first classification model CM1 may be a ROBERTA model. The way to train the ROBERTA model is to swap two sentences in different order in the article to determine whether they are still the related sentences, and use a dynamic masking (that is, masking different text each time) method to mask text in the article during the training process. Hence, by predicting different texts and swapping two sentences in different order, the ROBERTA model learns to determine whether the exchanged sentences match context or not during the training process so as to enhance the analysis ability of the ROBERTA model (that is, semantic analysis). After the processor 15 maps each of the sentences to the multi-dimensional vector space, the each of the sentences has a distance to one another in the vector space, so the processor 15 can classify the each of the sentences based on the distance of the each of the sentences to one another in the vector space. The feature identification model 132 is generated after the processor 15 completes the training of the supervised learning of the first classification model CM1.

Figure 5:
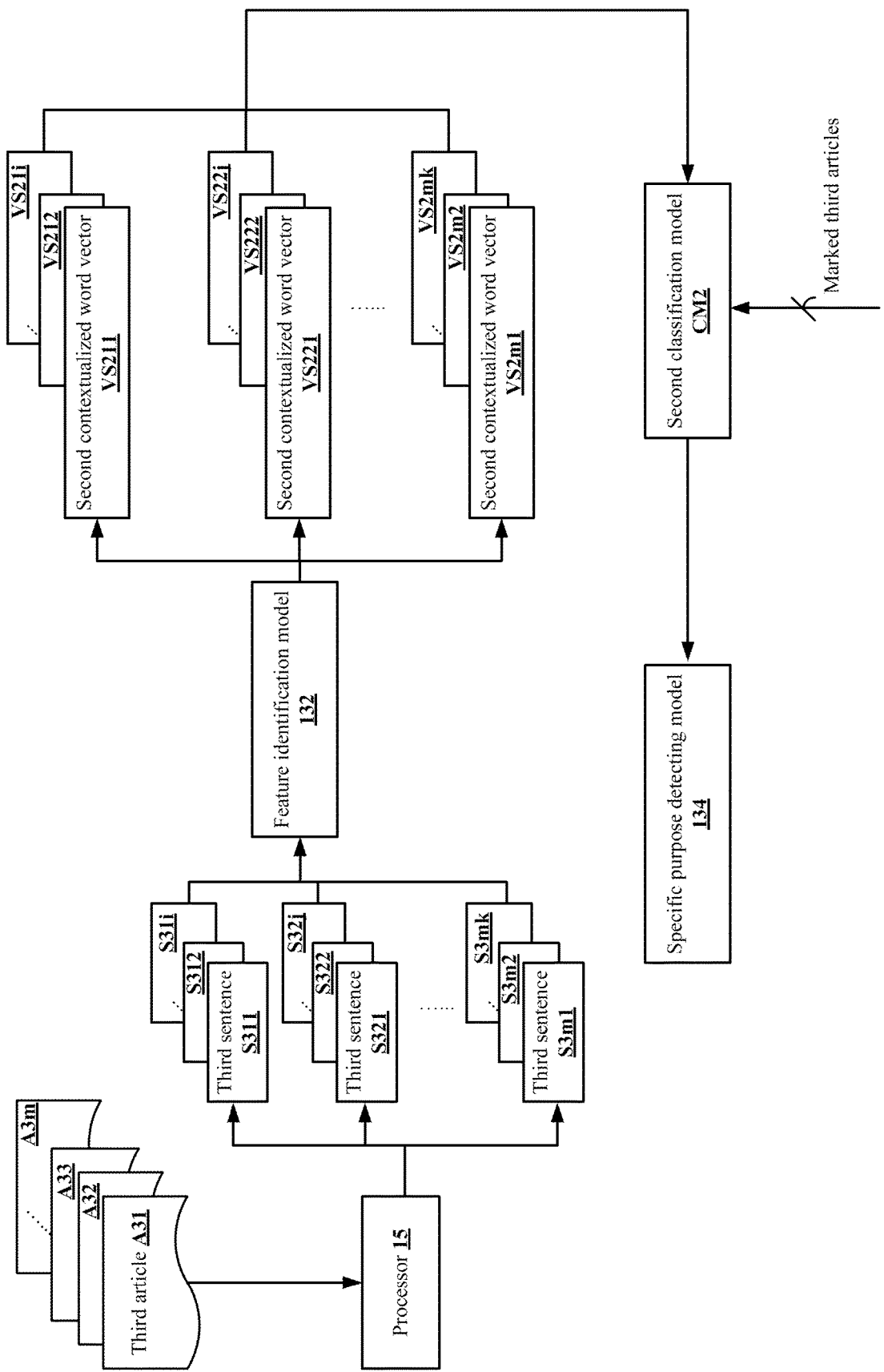
FIG. 5 depicts a schematic diagram of an implementation process flow of training a specific purpose detecting model according to a third embodiment of the present disclosure.
Figure 6:
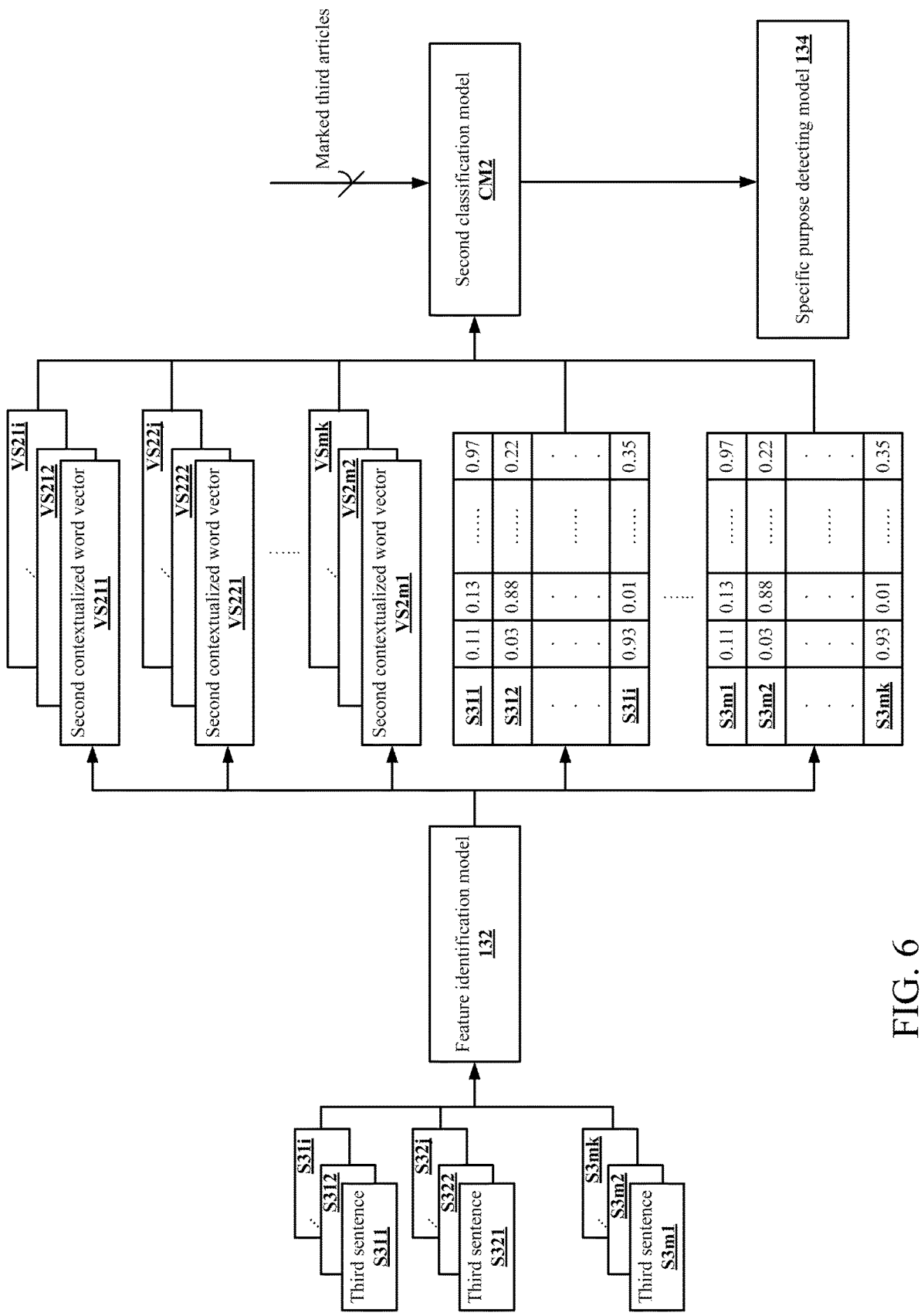
FIG. 6 depicts a schematic diagram of another implementation process flow of training the specific purpose detecting model according to the third embodiment of the present disclosure.

A third embodiment of the present disclosure is shown in FIG. 5 and FIG. 6. The third embodiment is an extension of the first embodiment and the second embodiment. In the present embodiment, the storage 13 is further configured to store a second classification model CM2. How to train the second classification model CM2 into the specific purpose detecting model 134 will be described below.

The processor 15 similarly first divides each of the third articles into third sentences according to the analysis rule after receiving the third articles via the transceiver 11, and then inputs the third sentences of each of the third articles to the trained feature identification model 132 to generate a second contextualized word vector corresponding to each of the third sentences. The processor 15 further marks the third articles according to whether each of the third articles conforms to a second specific purpose or not, and inputs the second contextualized word vector of each of the third sentences of each of the third articles and the marked third articles to the second classification model CM2, and performs supervised learning on the second classification model CM2 to train it and generate the specific purpose detecting model 134.

A description is provided with reference to FIG. 5. In greater detail, after the processor 15 receives m third articles A31, A32, A33 . . . A3m, the processor 15 divides each of the m third articles A31, A32, A33 . . . A3m into third sentences based on a semantic analysis. For example, the third article A31 is divided into i third sentences S311, S312 . . . S31i, the third article A32 is divided into j third sentences S321, S322 . . . S32j, until the $m^{th}$ third article A3m is divided into k third sentences S3m1, S3m2 . . . S3mk.

Then, the processor 15 inputs the third sentences S311, S312 . . . S31i, S321, S322 . . . S32j, S3m1, S3m2 . . . S3mk of the third articles A31, A32, A33 . . . A3m to the trained feature identification model 132, so as to generate a second contextualized word vector VS211 corresponding to the third sentence S311, a second contextualized word vector VS212 corresponding to the third sentence S312, a second contextualized word vector VS21i corresponding to the third sentence S31i, a second contextualized word vector VS221 corresponding to the third sentence S321, a second contextualized word vector VS222 corresponding to the third sentence S322, a second contextualized word vector VS22j corresponding to the third sentence S32j, a second contextualized word vector VS2m1 corresponding to the third sentence S3m1, a second contextualized word vector VS2m2 corresponding to the third sentence S3m2, a second contextualized word vector VS2mk corresponding to the third sentence S3mk, and the like.

The processor 15 merges the second contextualized word vector, which include the second contextualized word vector VS211 of the third sentence S311, the second contextualized word vector VS212 of the third sentence S312, the second contextualized word vector VS21i of the third sentence S31i, etc., into a contextualized word vector corresponding to the third article A31. The processor 15 merges the second contextualized word vector, which include the second contextualized word vector VS221 of the third sentence S321, the second contextualized word vector VS222 of the third sentence S322, the second contextualized word vector VS22$j$ of the third sentence S32$j$, etc., into a contextualized word vector corresponding to the third article A32. The processor 15 merges the second contextualized word vector, which include the second contextualized word vector VS2$m$1 of the third sentence S3$m$1, the second contextualized word vector VS2$m$2 of the third sentence S3$m$2, the second contextualized word vector VS2$mk$ of the third sentence S3$mk$, etc., into a contextualized word vector corresponding to the third article A3$m$.

In addition to that, the processor 15 further marks the article according to a specific purpose. For example, if the specific purpose is to identify whether the article is fake news or not, during the training process of the specific purpose detecting model 134 the processor 15 marks the third article A31 as fake news, the third article A32 as fake news, the third article A33 as real news, until marks the last third article A3$m$ as fake news. After that, the processor 15 inputs the representation of each of the third articles in a vector space and the marked third articles to the second classification model CM2 to perform supervised learning on the second classification model CM2 so as to allow the second classification model CM2 to learn vector space distributions corresponding to different specific purposes. The second classification model CM2 is thus trained and the specific purpose detecting model 134 is generated.

The specific purpose detecting model 134 is mainly configured to identify abnormal vectors. Articles with the same specific purpose (for example, identifying fake news) are more similar in their vector space distributions. If an article with another specific purpose (for example, real news) is input, a distribution of the article that is not fake news in the vector space will have a larger difference from a distribution of the article that is fake news in the vector space. As a result, the purpose corresponding to the article can be determined via the specific purpose detecting model 134 according to the present disclosure.

In other embodiments, the processor 15 inputs the third sentences of each of the third articles A31, A32, A33 . . . A3$m$ to the feature identification model 132 to generate feature scores corresponding to each of the third sentences, and selects a maximum value of the feature scores of each of the third sentences as a representative feature score of each of the third sentences. When the second classification model CM2 is trained, the processor 15 inputs the second contextualized word vector of each of the third sentences of each of the third articles, the marked third articles, and the representative feature score of each of the third sentences and a feature corresponding to the representative feature score to the second classification model CM2 at the same time to train it and generate the specific purpose detecting model 134. Accordingly, the specific purpose detecting model 134 can more accurately determine the purpose of the article.

For example, a description is provided with reference to FIG. 6. FIG. 6 depicts an implementation scenario for training the specific purpose detecting model according to the present disclosure. Owing to the layout limitation, only the feature scores 0.11, 0.13 . . . 0.97 corresponding to the third sentence S311, the feature scores 0.03, 0.88 . . . 0.22 corresponding to the third sentence S312, and the feature scores 0.93, 0.01 . . . 0.35 corresponding to the third sentence S3$mk$ output by the feature identification model 132 are shown in FIG. 6.

When the processor 15 trains the second classification model CM2, it will select 0.97 as a representative feature score of the third sentence S311, select 0.88 as a representative feature score of the third sentence S312, and select 0.93 as a representative feature score of the third sentence S3$mk$, and input the representative feature scores 0.97, 0.88, 0.93 and their respective corresponding features to the second classification model CM2 to improve the accuracy of the specific purpose detecting model 134.

Figure 7:
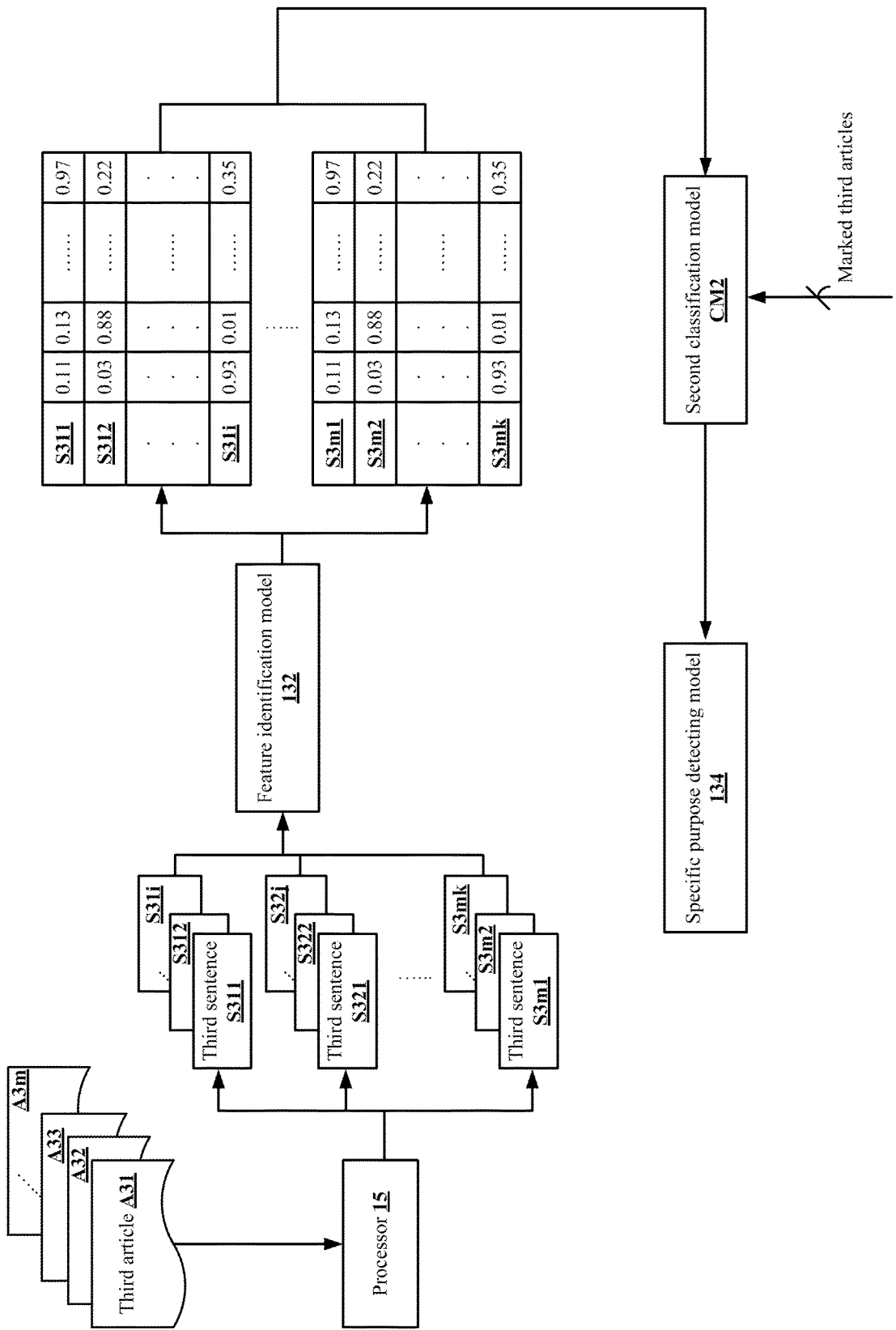
FIG. 7 depicts a schematic diagram of an implementation process flow of training a specific purpose detecting model according to a fourth embodiment of the present disclosure.

A fourth embodiment of the present disclosure is shown in FIG. 7. The fourth embodiment is also an extension of the first embodiment and the second embodiment. Different from the third embodiment, the processor 15 only uses the feature scores of the third sentences to train the second classification model CM2 in the present embodiment. In greater detail, after the processor 15 inputs the third sentences of each of the third articles to the feature identification model 132, only the feature scores corresponding to each of the third sentences S311, S312 . . . S31$i$, S321, S322 . . . S32$j$, S3$m$1, S3$m$2 . . . S3$mk$ are generated. Similarly, the processor 15 will mark whether each of the third articles conforms to a second specific purpose or not, and input the feature scores of each of the third sentences of each of the third articles and the marked third articles to the second classification model CM2 to generate the specific purpose detecting model 134.

In other embodiments, the processor 15 trains the second classification model CM2 by means of linear combination discrimination. In greater detail, the processor 15 receives a fourth article A4 via the transceiver 11, divides the fourth article A4 into the fourth sentences S41, S42, S43 . . . S4$t$ according to the analysis rule, and inputs the fourth sentences S41, S42, S43 . . . S4$t$ of the fourth article A4 to the feature identification model 132 to generate feature scores corresponding to each of the fourth sentences.

Figure 8:
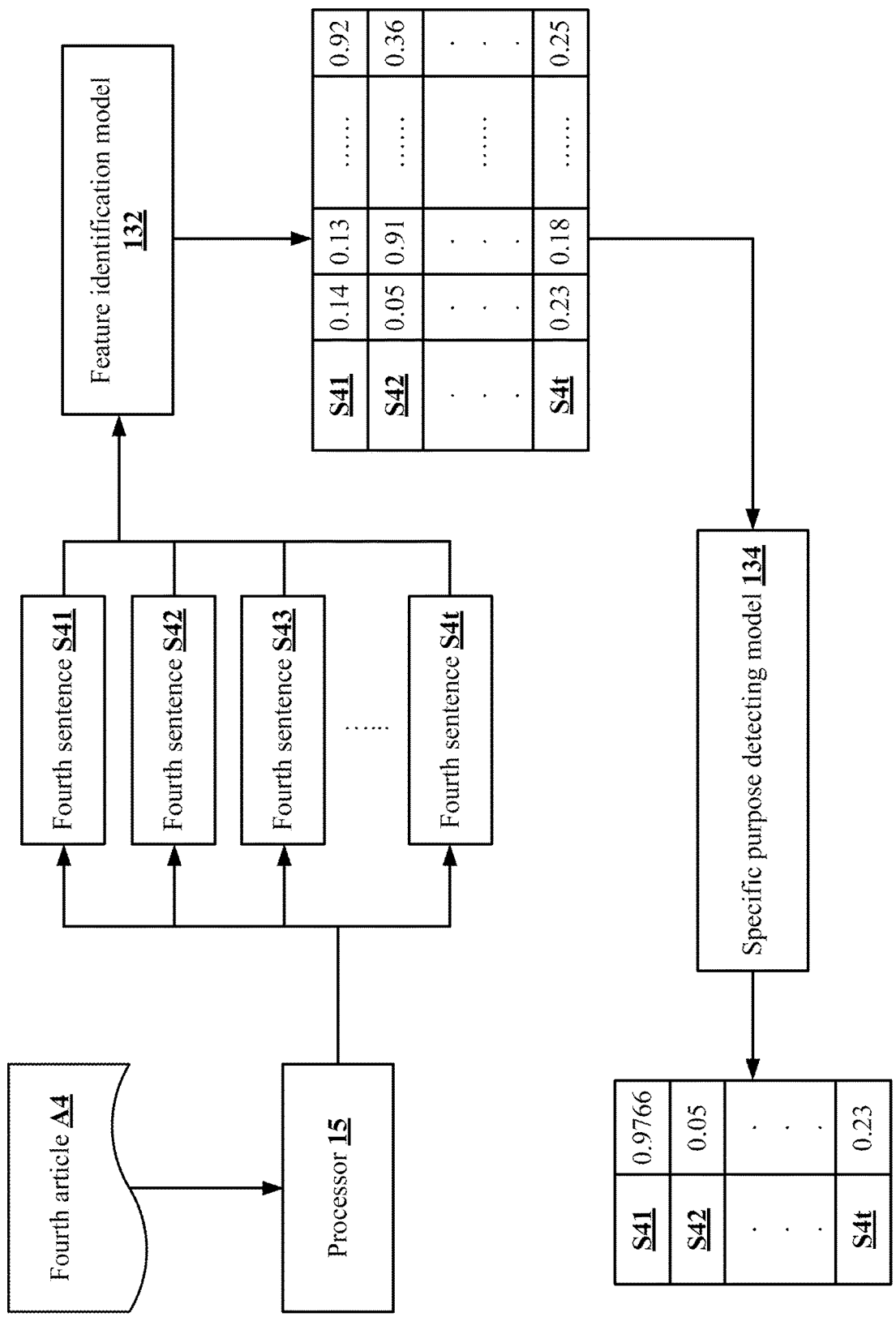
FIG. 8 depicts a schematic diagram of another implementation process flow of training the specific purpose detecting model according to the fourth embodiment of the present disclosure.

Then, the processor 15 composes the feature scores of each of the fourth sentences into a second contextualized word vector of the fourth article A4, and inputs the second contextualized word vector (that is, the feature scores of each of the fourth sentences) to the specific purpose detecting model 134 to generate a sentence score corresponding to each of the fourth sentences. The processor 15 adds up the sentence score of each of the fourth sentences and divides it by a sentence number of the fourth sentences of the fourth article A4 to obtain an article score corresponding to the fourth article A4, and determines that the fourth article A4 conforms to the second specific purpose according to the article score, as shown in FIG. 8.

In addition, the processor 15 further uses a weighted calculation method to determine a specific purpose of the fourth article A4 according to other embodiments. In greater detail, a weight value is related to sentences after the article is divided. The processor 15 multiplies the article score of the fourth article A4 by a weight value corresponding to the sentence number to obtain a weighted article score of the fourth article A4, and determines that the fourth article A4 conforms to the second specific purpose according to the weighted article score.

Figure 9:
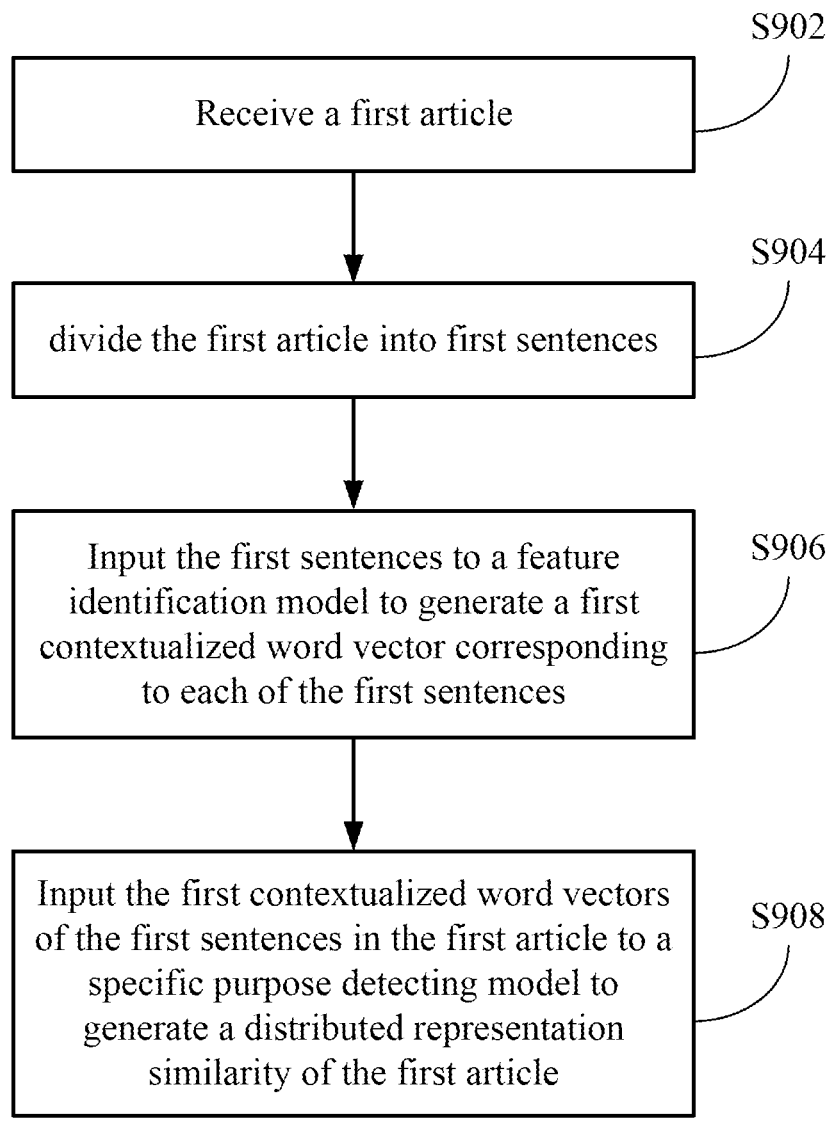
FIG. 9 depicts a flowchart of a method for detecting a purpose of an article according to a fifth embodiment of the present disclosure.

A fifth embodiment of the present disclosure describes a method for detecting a purpose of an article, and a flowchart of the method is shown in FIG. 9. The method for detecting the purpose of the article is applied to a device for detecting a purpose of an article, e.g., the device for detecting the purpose of the article 1 described above. A description of the steps included in the method for detecting the purpose of the article is provided as follows.

First, step S902 is executed to receive a first article. Step S904 is executed to divide the first article into first sentences. Then, step S906 is executed to input the first sentences to a feature identification model to generate a first contextualized word vector corresponding to each of the first sentences. Step S908 is executed to input the first contextualized word vector of the first sentences in the first article to a specific purpose detecting model to generate a distributed representation similarity of the first article. When the distributed representation similarity is greater than a first threshold, it is determined that the first article conforms to a first specific purpose. The first contextualized word vector includes feature vectors, in which each of the feature vectors corresponds to a feature. The feature is one of features being arbitrary, being emotional, being inferential, being appealing, comprising a personal testimonial, being advocative and sharing.

In other embodiments, the method for detecting the purpose of the article further inputs the first contextualized word vector of the first sentences in the first article to the specific purpose detecting model to generate an article score of the first article. When the article score is greater than a second threshold, it is determined that the first article conforms to the first specific purpose.

In other embodiments, the method for detecting the purpose of the article further displays the first sentences, a feature corresponding to each of the first sentences, and the article score via a display interface. The feature is a feature with a greatest vector value among the feature vectors of one of the first contextualized word vector corresponding to the each of the first sentences.

Figure 10:
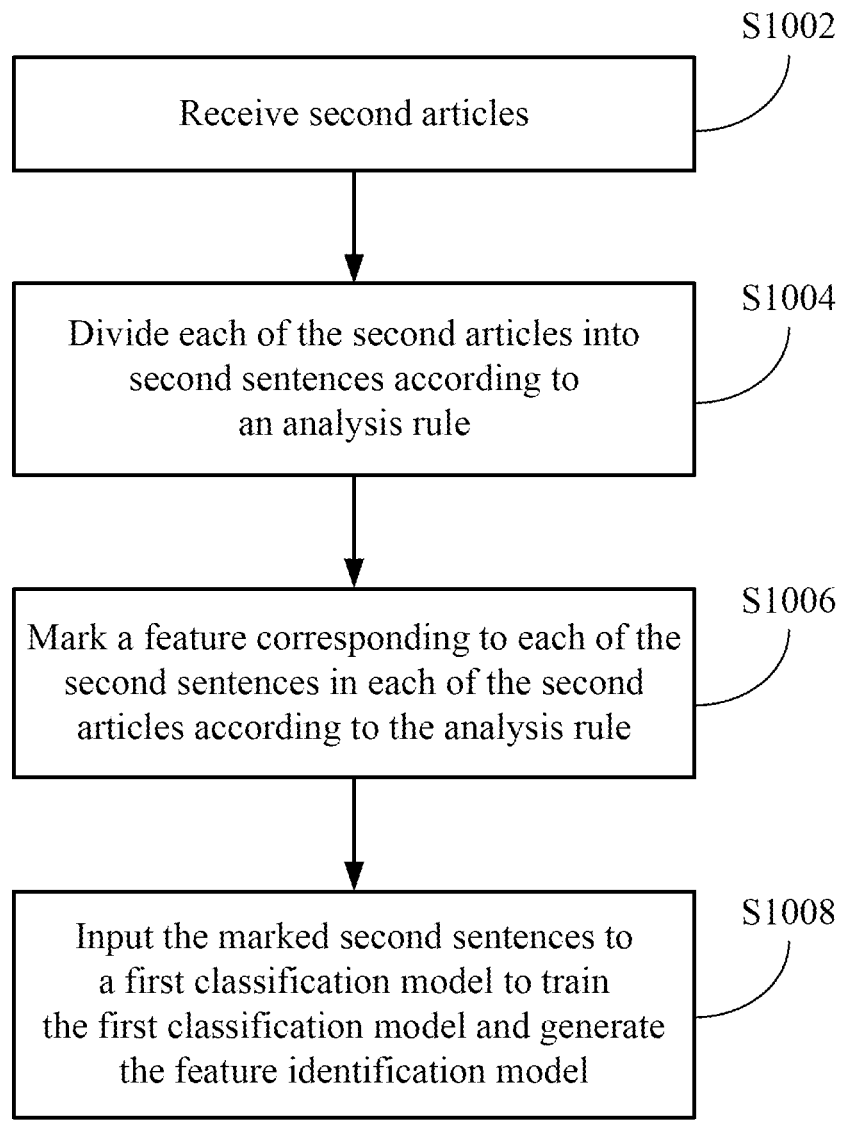
FIG. 10 depicts a flowchart of a method for generating a feature identification model according to a sixth embodiment of the present disclosure.

A flowchart of a sixth embodiment is shown in FIG. 10. In the present embodiment, a method for generating the feature identification model includes the steps as follows. Step S1002 is executed to receive second articles. Step S1004 is executed to divide each of the second articles into second sentences according to an analysis rule. Step S1006 is executed to mark a feature corresponding to each of the second sentences in each of the second articles according to the analysis rule. Step S1008 is executed to input the marked second sentences to a first classification model to train the first classification model and generate the feature identification model.

Figure 11:
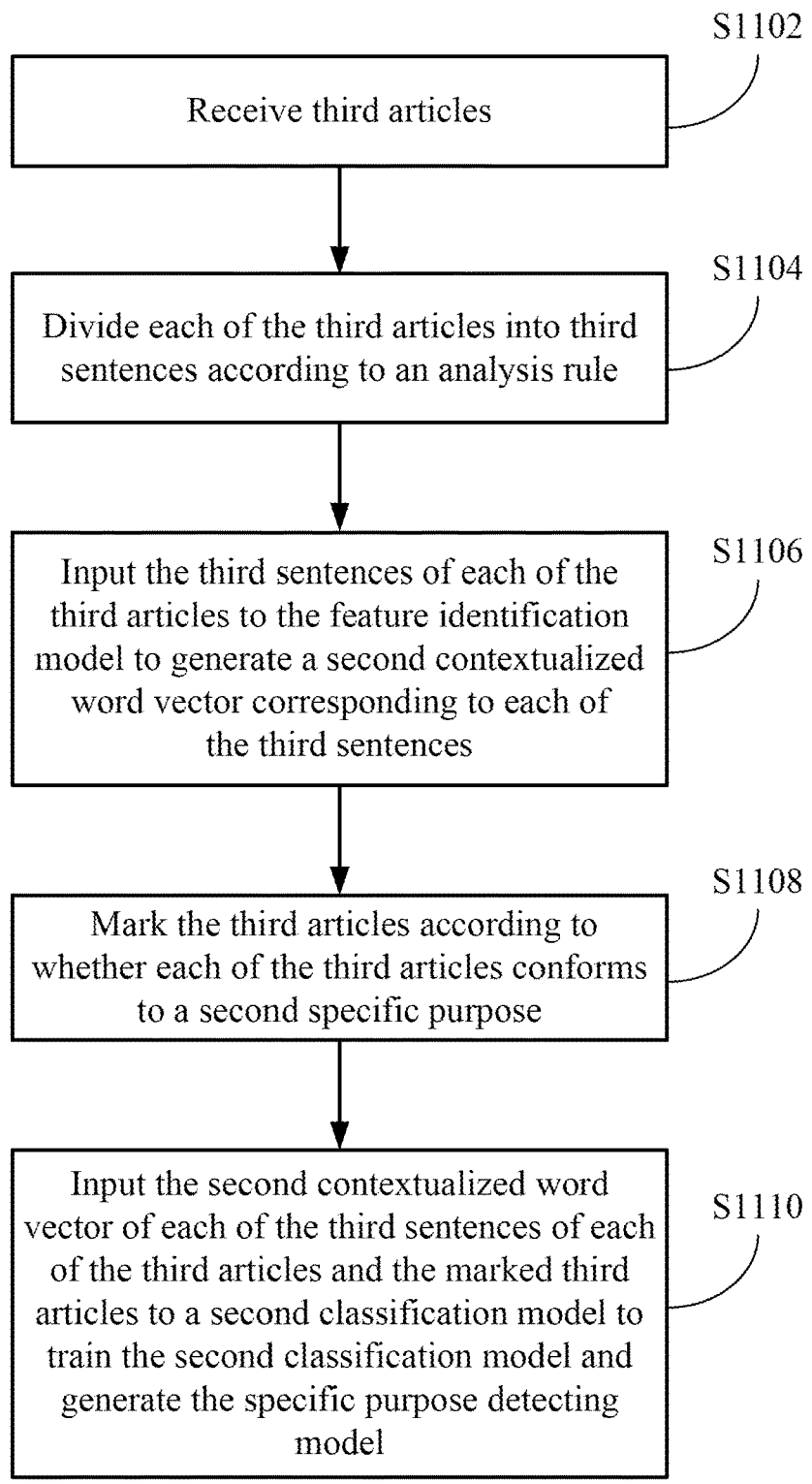
FIG. 11 depicts a flowchart of a method for training and generating a specific purpose detecting model according to a seventh embodiment of the present disclosure.

A flowchart of a seventh embodiment is shown in FIG. 11. In the present embodiment, a method for generating the specific purpose detecting model includes the steps as follows. Step S1102 is executed to receive third articles. Step S1104 is executed to divide each of the third articles into third sentences according to an analysis rule. Step S1106 is executed to input the third sentences of each of the third articles to the feature identification model to generate a second contextualized word vector corresponding to each of the third sentences. Step S1108 is executed to mark the third articles according to whether each of the third articles conforms to a second specific purpose. Step S1110 is executed to input the second contextualized word vector of each of the third sentences of each of the third articles and the marked third articles to a second classification model to train the second classification model and generate the specific purpose detecting model. The flowchart of the above method is shown in FIG. 11.

In other embodiments, the method for generating the specific purpose detecting model further inputs the third sentences of each of the third articles to the feature identification model to generate feature scores corresponding to each of the third sentences, selects a maximum value of the feature scores of each of the third sentences as a representative feature score of each of the third sentences, and inputs the representative feature score of each of the third sentences and a feature corresponding to the representative feature score to the second classification model to train it and generate the specific purpose detecting model.

Figure 12:
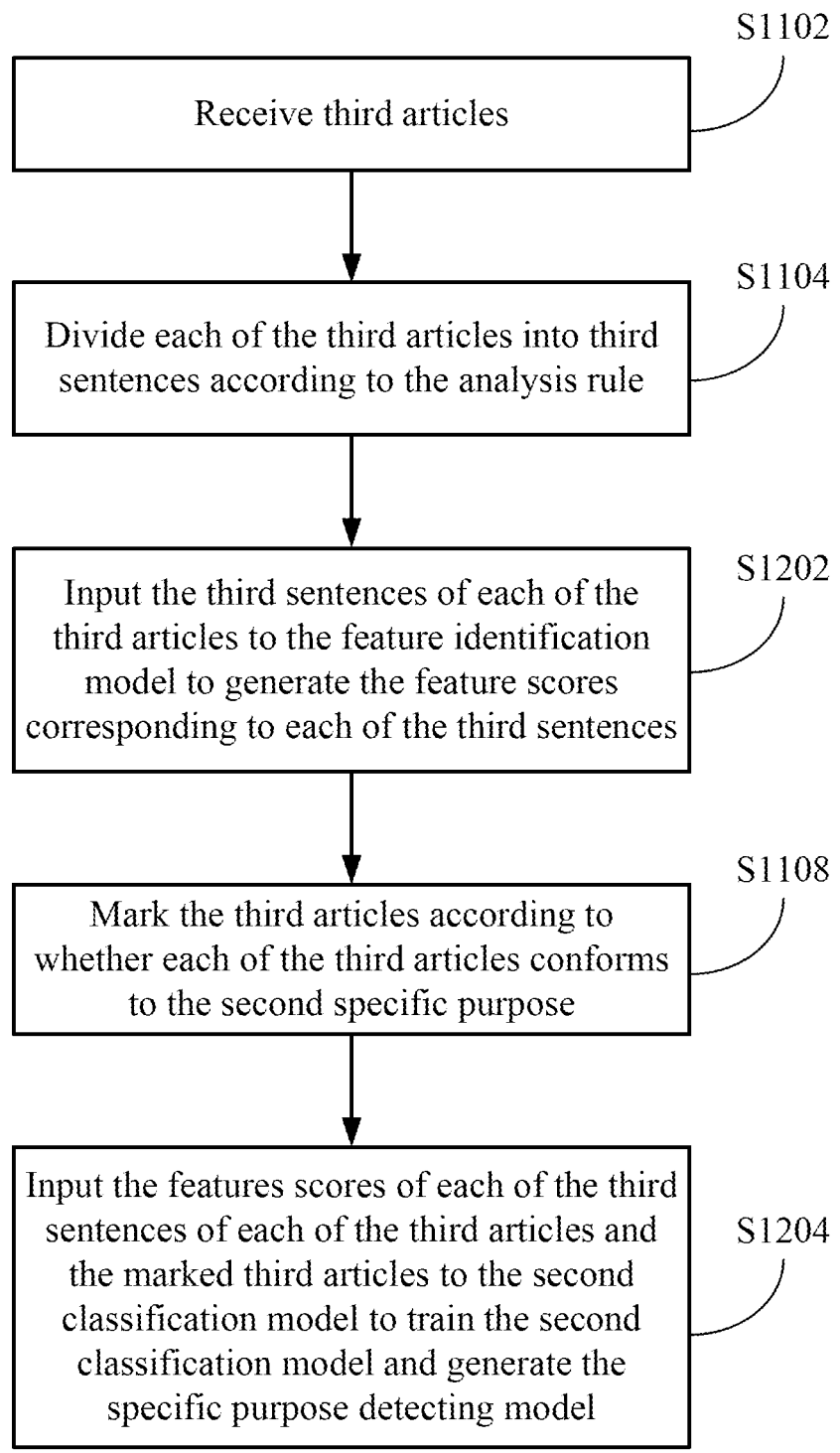
FIG. 12 depicts a flowchart of another method for training and generating the specific purpose detecting model according to the seventh embodiment of the present disclosure.

Another flowchart of the seventh embodiment is shown in FIG. 12. In the present embodiment, a method for generating the specific purpose detecting model includes the steps as follows. Step S1102 is executed to receive the third articles. Step S1104 is executed to divide each of the third articles into the third sentences according to the analysis rule. Step S1202 is executed to input the third sentences of each of the third articles to the feature identification model to generate the feature scores corresponding to each of the third sentences. Step S1108 is executed to mark the third articles according to whether each of the third articles conforms to the second specific purpose. Step S1204 is executed to input the features scores of each of the third sentences of each of the third articles and the marked third articles to the second classification model to train the second classification model and generate the specific purpose detecting model.

Figure 13:
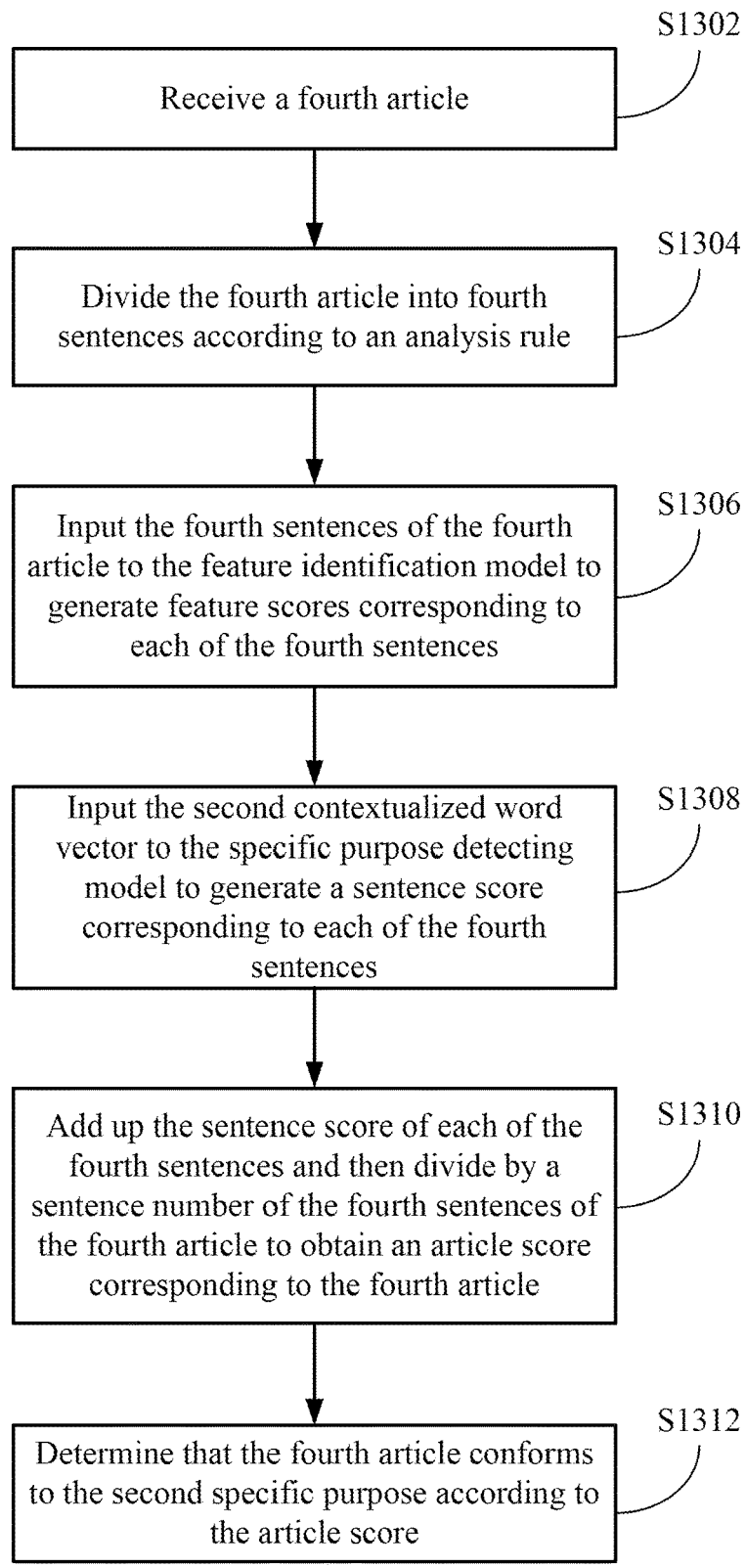
FIG. 13 depicts a flowchart of a method for detecting a purpose of an article according to an eighth embodiment of the present disclosure.

A flowchart of an eighth embodiment is shown in FIG. 13. In the present embodiment, after generating the feature identification model and the specific purpose detecting model, the method for detecting the purpose of the article further includes step S1302 which is executed to receive a fourth article. Step S1304 is executed to divide the fourth article into fourth sentences according to an analysis rule. Step S1306 is executed to input the fourth sentences of the fourth article to the feature identification model to generate feature scores corresponding to each of the fourth sentences. The feature scores of each of the fourth sentences compose a second contextualized word vector of the fourth article. Step S1308 is executed to input the second contextualized word vector to the specific purpose detecting model to generate a sentence score corresponding to each of the fourth sentences. Step S1310 is executed to add up the sentence score of each of the fourth sentences and then divide by a sentence number of the fourth sentences of the fourth article to obtain an article score corresponding to the fourth article. Step S1312 is executed to determine that the fourth article conforms to the second specific purpose according to the article score.

In other embodiments, the method for detecting the purpose of the article further multiplies the article score of the fourth article by a weight value corresponding to the sentence number to obtain a weighted article score of the fourth article, and determines that the fourth article conforms to the second specific purpose according to the weighted article score.

In addition to the above steps, the method for detecting the purpose of the article according to the present disclosure can also perform all operations described in all the foregoing embodiments and have all the corresponding functions. How this embodiment executes these operations and has these functions will be readily appreciated by those of ordinary skill in the art based on all the foregoing embodiments, and thus will not be further described herein.

In summary, the mechanism for detecting the purpose of the article according to the present disclosure maps the sentences of the article to a vector space through the feature identification model, and determines whether the distribution of the article in the vector space is similar to a distribution of an article with a specific purpose in the vector space or not through the specific purpose detecting model. As a result, whether the article has the specific purpose or not is determined, or the specific purpose corresponding to the article is determined. Accordingly, the mechanism for detecting the purpose of the article according to the present disclosure can quickly determine the purpose of the article.

Not only is the manpower required for making judgments reduced, but the time used for determining the purpose of the article is also greatly saved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims and their equivalents.

What is claimed is:

1. A device for detecting a purpose of an article comprising:
    a transceiver;
    a storage configured to store a feature identification model and a specific purpose detecting model; and
    a processor electrically connected to the storage and the transceiver, and being configured to perform operations comprising:
    receiving a first article via the transceiver;
    dividing the first article into a plurality of first sentences;
    inputting the first sentences to the feature identification model to generate a first contextualized word vector corresponding to each of the first sentences;
    inputting the first contextualized word vector of the first sentences in the first article to the specific purpose detecting model to generate a distributed representation similarity of the first article; and
    determining that the first article conforms to a first specific purpose when the distributed representation similarity is greater than a first threshold.

2. The device of claim 1, wherein the processor is further configured to perform operations comprising:
    inputting the first contextualized word vector of the first sentences in the first article to the specific purpose detecting model to generate an article score of the first article; and
    determining that the first article conforms to the first specific purpose when the article score is greater than a second threshold.

3. The device of claim 2, further comprising a display interface, the processor is further configured to perform operation comprising:
    displaying the first sentences, a feature corresponding to each of the first sentences, and the article score on the display interface, wherein the feature is a feature with a greatest vector value among a plurality of feature vectors of one of the first contextualized word vector corresponding to the each of the first sentences.

4. The device of claim 1, wherein each of the first contextualized word vector comprises a plurality of feature vectors, wherein each of the feature vectors corresponds to a feature, the feature is one of arbitrary, emotional, inferential, appealing, witnessing, and advocating and sharing.

5. The device of claim 1, wherein the storage is further configured to store a first classification model, the processor is further configured to perform operations comprising:
    receiving a plurality of second articles via the transceiver;
    dividing each of the second articles into a plurality of second sentences according to an analysis rule;
    marking a feature corresponding to each of the second sentences of each of the second articles according to the analysis rule; and
    inputting the marked second sentences and their corresponding features to the first classification model to train the first classification model and generate the feature identification model.

6. The device of claim 5, wherein the storage is further configured to store a second classification model, the processor is further configured to perform operations comprising:
    receiving a plurality of third articles via the transceiver;
    dividing each of the third articles into a plurality of third sentences according to the analysis rule;
    inputting the third sentences of each of the third articles to the feature identification model to generate a second contextualized word vector corresponding to each of the third sentences;
    marking the third articles according to whether each of the third articles conforms to a second specific purpose, and
    inputting the second contextualized word vector of each of the third sentences of each of the third articles and the marked third articles to the second classification model to train the second classification model and generate the specific purpose detecting model.

7. The device of claim 6, wherein the processor is further configured to perform operations comprising:
    inputting the third sentences of each of the third articles to the feature identification model to generate a plurality of feature scores corresponding to each of the third sentences,
    selecting a maximum value of the feature scores of each of the third sentences as a representative feature score of each of the third sentences; and
    inputting the representative feature score of each of the third sentences and a feature corresponding to the representative feature score to the second classification model to train the second classification model and generate the specific purpose detecting model.

8. The device of claim 5, wherein the storage is further configured to store a second classification model, the processor is further configured to perform operations comprising:
    receiving a plurality of third articles via the transceiver;
    dividing each of the third articles into a plurality of third sentences according to the analysis rule;
    inputting the third sentences of each of the third articles to the feature identification model to generate a plurality of feature scores corresponding to each of the third sentences;
    marking the third articles according to whether each of the third articles conforms to a second specific purpose, and
    inputting the feature scores of each of the third sentences of each of the third articles and the marked third articles to the second classification model to train the second classification model and generate the specific purpose detecting model.

9. The device of claim 8, wherein the processor is further configured to perform operations comprising:
    receiving a fourth article via the transceiver;
    dividing the fourth article into a plurality of fourth sentences according to the analysis rule;
    inputting the fourth sentences of the fourth article to the feature identification model to generate a plurality of feature scores corresponding to each of the fourth sentences, the feature scores of each of the fourth sentences composing a second contextualized word vector of the fourth article;

inputting the second contextualized word vector to the specific purpose detecting model to generate a sentence score corresponding to each of the fourth sentences;

adding up the sentence score of each of the fourth sentences and dividing the added sentence score by a sentence number of the fourth sentences of the fourth article to obtain an article score corresponding to the fourth article; and determining that the fourth article conforms to the second specific purpose according to the article score.

10. The device of claim 9, wherein the processor is further configured to perform operations comprising:

multiplying the article score of the fourth article by a weight value corresponding to the sentence number to obtain a weighted article score of the fourth article; and determining that the fourth article conforms to the second specific purpose according to the weighted article score.

11. A method for detecting a purpose of an article comprising:

receiving a first article;

dividing the first article into a plurality of first sentences;

inputting the first sentences to a feature identification model to generate a first contextualized word vector corresponding to each of the first sentences;

inputting the first contextualized word vector of the first sentences in the first article to a specific purpose detecting model to generate a distributed representation similarity of the first article; and determining that the first article conforms to a first specific purpose when the distributed representation similarity is greater than a first threshold.

12. The method of claim 11, further comprising:

inputting the first contextualized word vector of the first sentences in the first article to the specific purpose detecting model to generate an article score of the first article; and determining that the first article conforms to the first specific purpose when the article score is greater than a second threshold.

13. The method of claim 12, further comprising:

displaying the first sentences, a feature corresponding to each of the first sentences, and the article score on a display interface, wherein the feature is a feature with a greatest vector value among a plurality of feature vectors of one of the first contextualized word vector corresponding to the each of the first sentences.

14. The method of claim 11, wherein each of the first contextualized word vector comprises a plurality of feature vectors, wherein each of the feature vectors corresponds to a feature, the feature is one of arbitrary, emotional, inferential, appealing, witnessing, and advocating and sharing.

15. The method of claim 11, further comprising:

receiving a plurality of second articles;

dividing each of the second articles into a plurality of second sentences according to an analysis rule;

marking a feature corresponding to each of the second sentences in each of the second articles according to the analysis rule; and inputting the marked second sentences and their corresponding features to a first classification model to train the first classification model and generate the feature identification model.

16. The method of claim 15, further comprising:

receiving a plurality of third articles;

dividing each of the third articles into a plurality of third sentences according to the analysis rule;

inputting the third sentences of each of the third articles to the feature identification model to generate a second contextualized word vector corresponding to each of the third sentences;

marking in the third articles for recording whether each of the third articles conforms to a second specific purpose, and inputting the second contextualized word vector of each of the third sentences of each of the third articles and the marked third articles to a second classification model to train the second classification model and generate the specific purpose detecting model.

17. The method of claim 16, further comprising:

inputting the third sentences of each of the third articles to the feature identification model to generate a plurality of feature scores corresponding to each of the third sentences;

selecting a maximum value of the feature scores of each of the third sentences as a representative feature score of each of the third sentences; and inputting the representative feature score of each of the third sentences and a feature corresponding to the representative feature score to the second classification model to train the second classification model and generate the specific purpose detecting model.

18. The method of claim 15, further comprising:

receiving a plurality of third articles;

dividing each of the third articles into a plurality of third sentences according to the analysis rule;

inputting the third sentences of each of the third articles to the feature identification model to generate a plurality of feature scores corresponding to each of the third sentences;

marking the third articles according to whether each of the third articles conforms to a second specific purpose, and inputting the feature scores of each of the third sentences of each of the third articles and the marked third articles to a second classification model to train the second classification model and generate the specific purpose detecting model.

19. The method of claim 18, further comprising:

receiving a fourth article;

dividing the fourth article into a plurality of fourth sentences according to the analysis rule;

inputting the fourth sentences of the fourth article to the feature identification model to generate a plurality of feature scores corresponding to each of the fourth sentences, the feature scores of each of the fourth sentences composing a second contextualized word vector of the fourth article;

inputting the second contextualized word vector to the specific purpose detecting model to generate a sentence score corresponding to each of the fourth sentences;

adding up the sentence score of each of the fourth sentences and dividing the added sentence score by a sentence number of the fourth sentences of the fourth article to obtain an article score corresponding to the fourth article; and determining that the fourth article conforms to the second specific purpose according to the article score.

20. The method of claim 19, further comprising:
multiplying the article score of the fourth article by a weight value corresponding to the sentence number to obtain a weighted article score of the fourth article; and
determining that the fourth article conforms to the second specific purpose according to the weighted article score.

\* \* \* \* \*